US007823261B2

(12) United States Patent
Rogers

(10) Patent No.: US 7,823,261 B2
(45) Date of Patent: Nov. 2, 2010

(54) METHODS FOR RECONDITIONING BARRELS

(76) Inventor: Eugene Joseph Rogers, 28246 San Marcos, Mission Viejo, CA (US) 92692

(*) Notice: Subject to any disclaimer, the term of this patent is extended or adjusted under 35 U.S.C. 154(b) by 1038 days.

(21) Appl. No.: 11/589,100

(22) Filed: Oct. 30, 2006

(65) Prior Publication Data

US 2008/0102179 A1 May 1, 2008

(51) Int. Cl.
*B23P 6/00* (2006.01)

(52) U.S. Cl. .............. 29/402.01; 29/407.01; 29/407.05; 29/402.19

(58) Field of Classification Search .............. 29/402.06, 29/402.19, 402.21, 402.05, 402.18, 407.01, 29/407.05; 83/178, 195; 409/143; 219/52.1
See application file for complete search history.

(56) References Cited

U.S. PATENT DOCUMENTS 4,827,994 A * 5/1989 Whitford .................... 144/392
5,118,015 A * 6/1992 Scholle et al. .............. 222/484
5,906,151 A * 5/1999 Firestone et al. .............. 99/276
6,325,212 B2 * 12/2001 Przytulla et al. ............ 206/509
6,616,002 B2 * 9/2003 Weil ............................ 217/76

* cited by examiner

*Primary Examiner*—Derris H Banks
*Assistant Examiner*—Tai Nguyen
(74) *Attorney, Agent, or Firm*—Lee C. Heiman, Esq.

(57) ABSTRACT

The inventive subject matter relates to methods for reconditioning a barrel previously used for containing a substance, comprising the steps of determining cutting parameters specific to the barrel material to provide controlled cutting of the barrel material; removing a desired depth of the barrel material using an automated high pressure water cutting device; testing for a remnant of the substance using a sensor device; optionally spraying with a dissolving agent; and repeating the steps of removing and testing upon detecting the presence of the substance in or on the barrel. Additionally, the inventive methods comprise applying a liquid to the wood of the reconditioned barrel to control evaporation of the barrel contents.

25 Claims, 2 Drawing Sheets

METHODS FOR RECONDITIONING BARRELS

BACKGROUND OF THE INVENTIVE SUBJECT MATTER

1. Field of Inventive Subject Matter

The inventive subject matter relates to methods for reconditioning a barrel previously used for containing a substance, comprising the steps of determining cutting parameters specific to the barrel material to provide controlled cutting of the barrel material; removing a desired depth of the barrel material using an automated high pressure water cutting device; testing for a remnant of the substance using a sensor device; optionally spraying with a dissolving agent; and repeating the steps of removing and testing upon detecting the presence of the substance in or on the barrel. Additionally, the inventive methods comprise applying a liquid to the wood of the reconditioned barrel to control evaporation of the barrel contents. In particular, the inventive subject matter relates to improved methods for reconditioning wood wine barrels.

2. Background

Fine wines are traditionally aged in oak barrels. The oak is integral to aging and imparts certain flavors to the wines. Every season, when trees are felled, experts from cooperages are on hand to select the best oak wood for use in the manufacture of barrels and vats. This selection is the initial phase that essentially determines the quality of the finished product. The oak is examined both before and after being cut, and wood is selected based on many criteria, including tree shape and growing conditions. These factors determine the textural variety of wood fibers, the fineness of its grain, and its tannin content. Tight grain and fine tannin content are found in the best wood.

The art of barrel making, known as cooperage, is an ancient skill. Despite improvement from modern research, analysis, machinery, and wood selection techniques, the actual barrel making process has changed very little over the years and is extremely time intensive. To achieve the highest standards of quality, most of the work must still be done by hand by a highly skilled cooper. Thus, barrels are relatively quite expensive for businesses which buy barrels for aging or storage, such as winemaking, liquor making, and food packaging.

Wine fermenting and aging in wood barrels extracts flavor components from the wood and leaves a residue of precipitated materials such as tartrates, finning agents, or yeast. Wine penetrates into a solid barrel stave approximately 3/16 to 1/4 inch. Even over a period of many years, exchange occurs through this depth.

Over time, all components which can be extracted from oak are, and the residue left in the wood can begin to sour or block the membrane exchange ability of the wood. The wine aging process can also leave undesirable bacterial contamination in a barrel, and there is no adequate current remedy for the problems created by residues and bacterial contamination. The barrel is then considered exhausted and is viewed either as a liability because of contamination, or at best as neutral storage for additional vintages.

The costs for winemakers and others to purchase new, top quality French oak barrels is quite high. Barrel reconditioning is one solution to this problem of high cost. Reconditioned barrels may cost a winemaker anywhere between $50 and $150; a substantially lower amount than the $700 or more for new French oak. In the 1970s and 1980s, a variety of companies were reconditioning barrels with mixed to poor results. This inconsistency turned many winemakers and other barrel purchasers away from reconditioning.

Additionally, the reuse of barrels is becoming an environmental issue. Reusing wine barrels can save hundreds of trees, and stop excessive waste created by discarded barrels.

In one prior art method of barrel shaving, bottom cutting routers or rotating wire brushes are used. These methods are largely unsuitable for making barrel environments to properly age premium wines. Although inadequate, however, these services remain in business because they are able to remove a small amount of the barrel's inner surface for a very modest fee. Barrel shaving, routers, and brushes all suffer the same failure. They remove material in a direction perpendicular to the grain of the barrel staves using mechanical cutting. This shreds the barrel surface and then must be sanded off. Sanding may actually cause greater deterioration to the barrel surface because it may grind exhausted wood into the pores of the newly exposed wood. When a barrel is retoasted after sanding, very undesirable "off" flavors can thus be baked into the new surface. Additionally, these processes may not remove enough wood to expose truly new wood, uncontaminated by previous wine.

A second prior art method, described in U.S. Pat. No. 5,630,265 to Stone, involves a method and apparatus for reconditioning wood wine barrels in which an open wine barrel (i.e., with ends removed) is placed on a barrel rotator stand and positioned into a planer-cutter apparatus. Cutting parameters are set, and a horizontal screw advances the cutter into the barrel, cutting a swath the length of the barrel stave. The cutting process is repeated through the number of passes required. The barrel is dried, placed on a toasting rotator stand, and toasted. As with previous methods to remove all undesirable wood, at times this plane-cutter process may not remove all remnants of wood which has absorbed wine. Again, when a barrel is retoasted, very undesirable "off" flavors can thus be baked into the new surface.

The inventive subject matter provides an improved method for reconditioning barrels, especially wood wine barrels. In a preferred embodiment, a used wine barrel with the heads removed is placed on a stand, cutting parameters are set, and an automated high pressure water cutting device is used to cut a swath to a pre-determined depth the length of the inside of the barrel. Preferably, the depth of cut of the high pressure water cutting device is actively monitored. Optionally, a laser depth sensing device is used with the high pressure water cutting head to monitor depth of cutting. The cutting process is repeated through the number of passes required to recondition the inside of the barrel.

After the cutting step is complete, the barrel is tested for the presence of a remnant of the wine using a sensor device which is capable of detecting wine residue in or on the barrel, preferably a light source and detector sensor such as a laser or an air sensor which detects substances associated with wine residue. If residue is detected, the cutting and testing steps are repeated until the amount of residue is undetectable or is below a threshold amount selected by the user. In the alternative or in combination, if residue is detected, a dissolving solution is sprayed on barrel surface to remove the residue.

The barrel is then dried, optionally on a toasting rotator stand, and is then positioned so that the elements of a toaster are inside the barrel, and the barrel ends are closed. The barrel heads are planed, dried, sanded, and toasted, and the barrel is re-assembled. Finally, the barrel is optionally sulphured and/or is treated with a composition which controls the rate of evaporation from the barrel in order to approximate the evaporation rate of a new barrel.

SUMMARY OF THE INVENTIVE SUBJECT MATTER

The inventive subject relates to a method for reconditioning a barrel previously used for containing a substance, the barrel having an interior surface comprising a barrel interior material, an exterior surface comprising a barrel exterior material, a first end, and a second end, each end comprising a barrel head, the method comprising:

(a) determining cutting parameters specific to the barrel interior material, the barrel exterior material, or both, wherein the cutting parameters provide controlled cutting of the barrel interior material, the barrel exterior material, or both;

(b) removing a desired depth of the barrel interior material or barrel exterior material using an automated high pressure water cutting device at a pressure determined by the cutting parameters;

(c) testing for the presence of a remnant of the substance using a sensor device which is capable of detecting the substance in or on the barrel interior or exterior;

wherein upon detecting the presence of the substance in or on the barrel interior, steps (b) and (c) are repeated.

DETAILED DESCRIPTION OF THE INVENTIVE SUBJECT MATTER

Definitions

Figure 1:
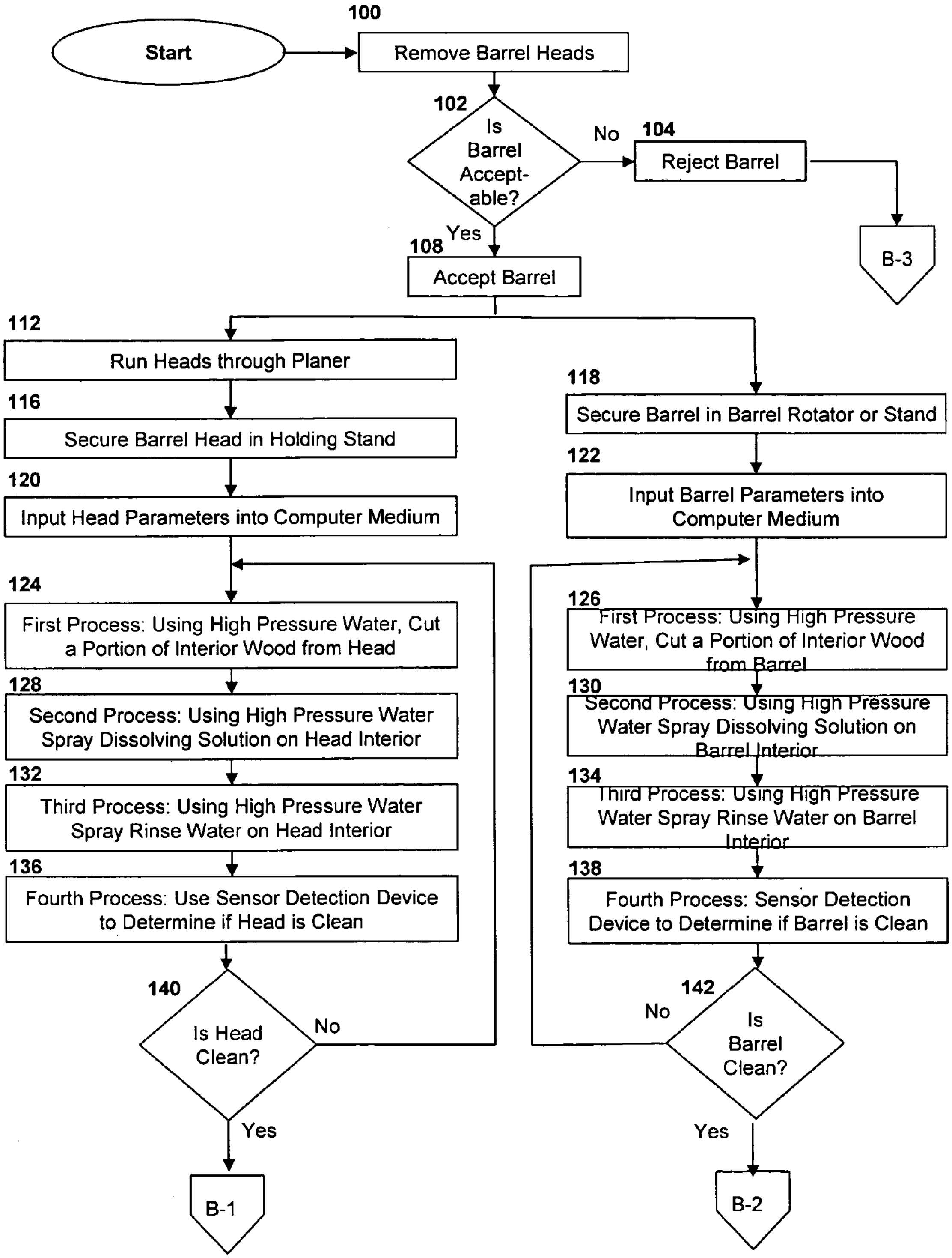
FIG. 1 is a flow chart which depicts a preferred embodiment of the inventive subject matter.
Figure 1:
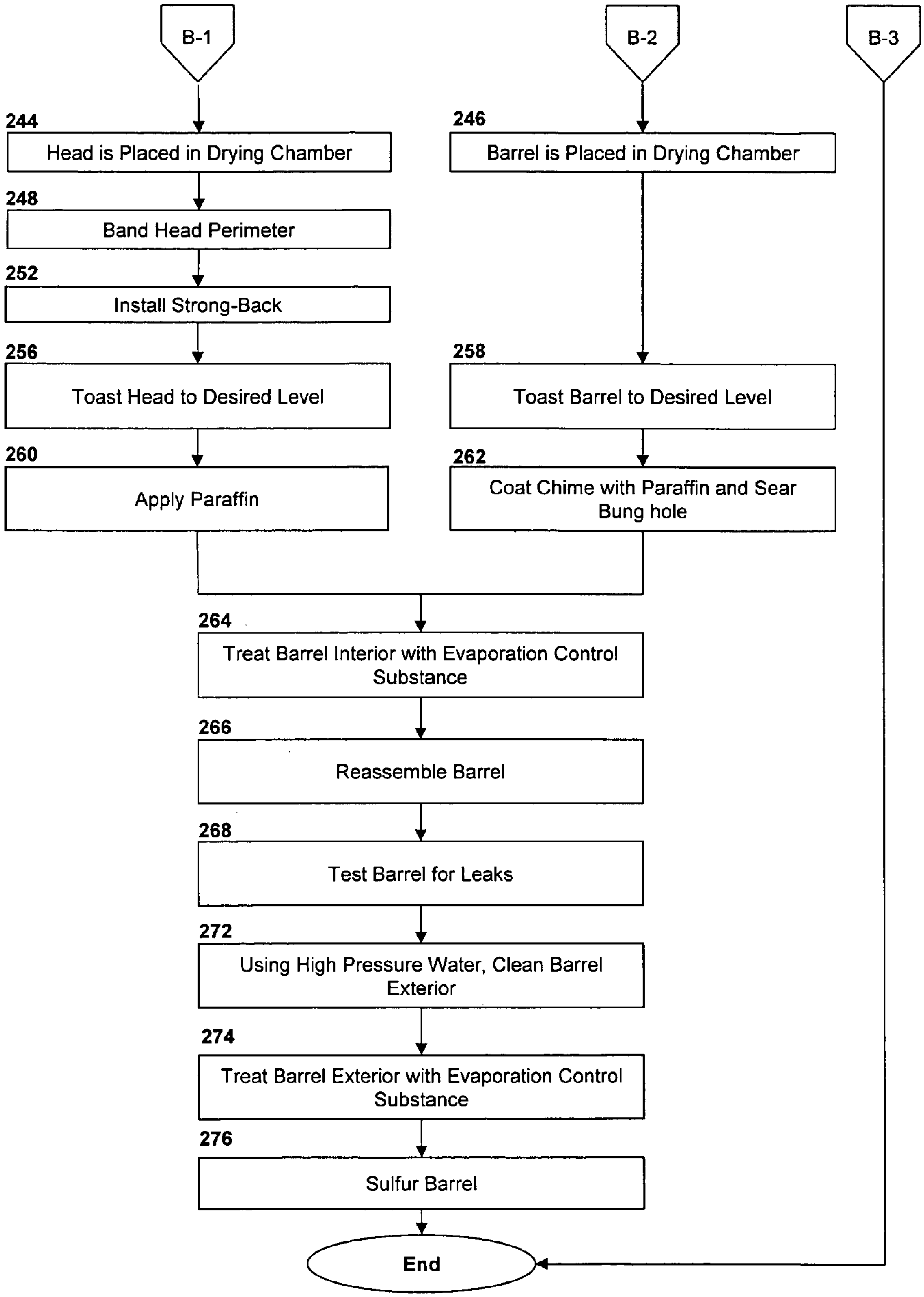

The term “computer” as used herein refers broadly to a machine for manipulating data according to a list of instructions, known as a program, and performs any automated process.

The Inventive Subject Matter

The inventive subject matter relates to methods for reconditioning a barrel, particularly a wood barrel such as an oak barrel, previously used for containing a substance, particularly a substance such as wine. In one embodiment, interior material is removed from the barrel using an automated high pressure water cutting device. The newly-exposed interior surface is then tested for a remnant of the substance using a sensor device, such as a laser or air sensor as described above, and if the presence of the substance is detected in or on the barrel, the steps of removing barrel material and testing are repeated until the barrel is sufficiently free from the residue of the substance.

Methods of the Inventive Subject Matter

Thus, the inventive subject relates to a method for reconditioning a barrel previously used for containing a substance, the barrel having an interior surface comprising a barrel interior material, an exterior surface comprising a barrel exterior material, a first end, and a second end, each end comprising a barrel head, the method comprising:

(a) determining cutting parameters specific to the barrel interior material, the barrel exterior material, or both, wherein the cutting parameters provide controlled cutting of the barrel interior material, the barrel exterior material, or both;

(b) removing a desired depth of the barrel interior material or barrel exterior material using an automated high pressure water cutting device at a pressure determined by the cutting parameters;

(c) testing for the presence of a remnant of the substance using a sensor device which is capable of detecting the substance in or on the barrel interior or exterior;

wherein upon detecting the presence of the substance in or on the barrel interior, steps (b) and (c) are repeated.

High pressure water cutting systems are known to those of skill in the art. In general, a pump pressurizes water and delivers it continuously to a cutting head that turns the pressurized water into a supersonic waterjet stream. The water circuit consists of inlet water filters, a booster pump, an intensifier, and a shock attenuator. Water is filtered by the inlet water filtration system—usually comprising a 1.0 and a 0.45 micron cartridge filter. The filtered water travels to the booster pump, where the inlet water pressure is maintained at approximately 90 psi—ensuring that the intensifier is never starved for water. The pressurized water is then sent to the intensifier pump and further pressurized to up to 60,000 psi. Before the water leaves the pump unit to travel through the plumbing to the cutting head, it first passes through the shock attenuator, which dampens pressure fluctuations to ensure the water exiting the cutting head is steady and consistent.

Once the high-pressure pump has created the water pressure, high-pressure plumbing delivers the water to the cutting head. In addition to transporting the high-pressure water, the plumbing also provides freedom of movement to the cutting head. The most common type of high-pressure plumbing is special stainless steel tubing.

The two types of waterjets are an original, “pure” waterjet and an abrasive waterjet. The “pure” waterjet is the original water cutting method, with first commercial applications in the early to mid 1970s. In a pure waterjet, the supersonic stream erodes the material. In the abrasive waterjet, the waterjet stream accelerates abrasive particles and those particles, not the water, erode the material. The abrasive waterjet is hundreds, if not thousands of times more powerful than a pure waterjet. For the present application, the “pure” waterjet, which leaves no abrasive residue, is preferred.

In one aspect of the inventive subject matter, the barrel material is wood. In another aspect, the barrel material is a wood composite.

In another aspect of the inventive subject matter, the substance is selected from the group consisting of wine, beer, liquor, and food. In a preferred embodiment, the substance is wine.

In a further aspect of the inventive subject matter, the high pressure water cutting device is mounted on a moveable mechanical arm. In a preferred embodiment, the mechanical arm makes predetermined passes over the barrel interior.

Thus, for example, the controller’s counter is set for the correct number of passes, and the cutting process is started. The moveable mechanical arm advances the high pressure water cutting device into the barrel. The cutting device cuts a swath the length of the barrel. Either the controller causes a rotator motor to rotate the barrel or the mechanical arm to the next cutting position, and the cutting process is then repeated through the number of passes required to cut and remove the inner surface of the barrel. Barrel rotator stands for interior surface cutting are known to one of ordinary skill in the barrel-making art.

In determining cutting parameters, preferably each barrel's size and configuration are taken into account, and the operation is automatically controlled via a controller computer module. Thus, in an alternate aspect of the inventive subject matter, the automated high pressure water cutting device is controlled by a computer program executed by a computer. In a preferred embodiment, the cutting parameters are inputted into the computer. Barrel cutting programs for interior surface cutting of barrels are known to one of ordinary skill in the barrel reconditioning art.

In yet another aspect of the inventive subject matter, upon detection of the substance in or on the barrel interior or exterior, a computer which is operably linked to the high pressure water cutting device executes a program to perform the following additional steps:

(d) determining and inputting into the computer the concentration and location of the remnant(s) of the substance detected, (e) determining revised cutting parameters to remove the remnant(s), and (f) repeating steps (b) and (c) based on the revised cutting parameters.

In another aspect of the inventive subject matter, the sensor device is a light source and light source detector calibrated to detect the substance. In a preferred embodiment, the light source is a laser or an air sensor which detects substances associated with wine residue.

In a further aspect of the inventive subject matter, the method comprises the additional step of spraying a dissolving or cleaning solution on a barrel surface. Sodium percarbonate is a granular form of hydrogen peroxide and sodium carbonate, and is one such cleaning agent. As an oxidizing bleaching agent it is a way to help clean "off" barrels and to remove tartrate deposits. In a preferred embodiment, the method comprises the additional step of removing the dissolving or cleaning solution by rinsing the interior barrel surface. In a more preferred embodiment, the step of rinsing comprises spraying water at a high pressure.

In another aspect of the inventive subject matter, the method comprises the additional step of drying the barrel. When the cutting and cleaning steps are complete, the barrel is dried in a drying chamber. Air drying of stave wood outside softens the barrel tannins. When the barrel's moisture content is reduced to an appropriate level, the barrel is removed from the dryer. Drying and storing barrels at a 12-13 percent humidity level allows the wood's sugars to once again leach out to the surface, prior to toasting. Barrel drying chambers and the use thereof are known to one of ordinary skill in the barrel-making and reconditioning arts.

In yet another aspect of the inventive subject matter, the method comprises the additional step of toasting the barrel. For example, the barrel is placed on a toasting stand and the stand is positioned in relation to a toaster so that the toaster elements are inside the barrel. A computer controller is started, and the barrel is heated. Once the barrel staves have reached the desired temperature, a timer is started by the controller and this temperature is maintained for a preset amount of time, toasting the barrel to the desired level.

The length of toasting results in a "toast level" on which the flavors of the wine or food aged in the barrel will partially depend. Toasting of the inside of the barrel changes the physical and chemical properties of the wood. The heat caramelizes sugars in the wood, giving rise to new compounds which add complexity. The toasted wood also acts as a buffer between the wine and the raw wood underneath. During the heating of the staves, some substances of the wood are caramelized and develop a multitude of aromas, such as vanilla, fresh bread, buttered bread, or a touch of nut, that will be found in the final taste of the wine or food. Toast level is adjusted according to the customers' requests: light, medium, or heavy toast. The process of toasting a barrel is known to one of ordinary skill in the barrel-making, and the wine and food processing arts.

In one embodiment, during the toasting process, a mister sprays a fine water mist into the barrel, driven by an inert gas. At time expiration of the toasting process, the heater is turned off and the barrel is removed from the toasting apparatus. Barrel toasting stands are known to one of ordinary skill in the barrel-making and reconditioning arts.

In yet a further aspect of the inventive subject matter, the method comprises the additional step of sulfuring the barrel. As is known to one of ordinary skill in the wine making art, sulfuring of barrels is done to maintain the disinfected condition of an empty barrel before filling it with new wine, in order to avoid the development of undesirable bacteria, such as *acetobacter*.

In an alternate aspect of the inventive subject matter, the barrel has a chime and the method comprises the additional step of coating the chime with paraffin. In this step, while the barrel is still hot, the inside from the chime to the end of the bowl are coated with food grade paraffin. When cool enough, the barrel is removed from the stand.

In yet another aspect of the inventive subject matter, the barrel has a bung hole and the method comprises the additional step of searing the bung hole.

In another aspect of the inventive subject matter, the method comprises the additional step of planing a barrel head. The heads, once removed from the barrel, are run through a planer which removes some of the interior surface. Once planed, the heads are dried, and the perimeter croze surface is sanded, reducing the head diameter and allowing for the reduced stave width of the dry barrel.

In a further aspect of the inventive subject matter, the method comprises the additional step of installing a strongback on a barrel head. In this step, the outside surface of the head is fitted with a strongback with curved ends. This board is stapled to the head and insures the head's alignment during barrel assembly and later when stacked in service. Once dry, clean, and strong-backed, the head is optionally placed in a head toaster. The heads are removed and while still warm, hot paraffin is applied to the croze edge and all exposed end grain around the edge of the head. Once cool, the heads are placed back into the barrel and all hoops are tightened by coopers. The barrels soundness is tested with water and air pressure held in the barrel to test for leaks.

In an alternate aspect of the inventive subject matter, wherein the barrel is a wood or wood composite barrel, the method comprises the additional step of sanding the barrel, a barrel head, or both. However, for the reasons discussed above, sanding should be minimized and it is thus preferable that the heads also be finished using a high pressure water cutting device.

Optionally, the exterior of the barrel is cleaned with high pressure water as well.

Controlled evaporation is particularly important to the conservation and aging of wine and spirits. The carbon dioxide and volatile ethers that cloak the aroma of wine and spirits must be allowed to evaporate through the barrel. Further, slow oxidation helps wine and spirits lose astringency and harshness, giving softness and suppleness instead. Red wines take on a warmer color and lose their purple-blueness. White wines are richer-colored. Spirits take on that beautiful golden coloring and a soft taste of amber.

Thus, in yet another aspect of the inventive subject matter, the method comprises the additional step of treating the barrel interior, the barrel exterior, or both with one or more substances which control the rate of evaporation from the barrel. In a preferred embodiment, the rate of evaporation so controlled is within 10% of the rate of evaporation of a new barrel. Desired rates of evaporation of wine stored or aging in a wood barrel are known to one of ordinary skill in the wine- and spirits-making arts.

For example, food grade paraffin can be used to coat all or parts of the interior and/or exterior of a barrel in order to control the evaporation rate. Other exemplary evaporation control substances include food grade silicon, natural and synthetic oils and greases such as block oil, food grade rosin and resins, and inert membrane and coating materials known to one of ordinary skill in the food processing and handling arts.

EXAMPLES

The following examples are illustrative of the inventive subject matter and are not intended to be limitations thereon.

Example 1

Exemplary Preparation of a Reconditioned Wood Barrel

The following example illustrates the preparation of a reconditioned wood barrel according to the inventive subject matter. Initially, both heads are removed from the barrel.

Then, cutting parameters specific to the barrel material to be cut are determined, so that the cutting parameters provide controlled cutting of the barrel material to the desired depth.

Next, the barrel is placed on a rotator stand, resting on floating roller assemblies which give support to any of the infinitely variable barrel shapes and curves, or the barrel is placed vertically in a holding stand. A desired depth of the barrel material is removed using an automated high pressure water cutting device at a pressure determined by the cutting parameters. The high pressure water cutting device is mounted on a moveable mechanical arm, and the mechanical arm makes predetermined passes over the barrel interior.

The water cutting device is controlled by a computer program executed by a computer/controller, which is programmed with general and barrel-specific cutting parameters. The computer/controller's counter is set for the correct number of passes, and the cutting process is started. The computer/controller causes a rotator motor to rotate the barrel or the cutter arm to the next cutting position. This cutting process is then repeated through the number of passes required to cut and remove the inner surface of the barrel.

Once the cutting process is complete, testing for the presence of a remnant of the substance is undertaken using a sensor device which is capable of detecting the substance in or on the barrel material. In one embodiment, the sensor device is a light source, preferably a laser, and light source detector calibrated to detect light wavelengths indicative of the substance. The laser is aimed at the barrel area which has been cut, and the detector analyzes light reflected back to the detector for the correct wavelength or wavelength pattern. In an alternate embodiment, the sensor device is an air sensor which detects substances associated with wine residue and given off by the barrel.

Upon detecting the presence of the substance in or on the barrel interior, the cutting and testing steps are repeated, with a computer which is operably linked to the high pressure water cutting device executing a program to determine the concentration and location of the remnant(s) of the substance detected after testing, to determine revised cutting parameters to remove the remnant(s), and repeating the cutting step based on the revised cutting parameters.

In addition to cutting with a high pressure water cutter, a dissolving solution is sprayed on the barrel surface and rinsed from the barrel surface with a high pressure water spray.

Next, the barrel is dried in a drying chamber, toasted, and treated with food grade paraffin to control the rate of evaporation from the barrel.

Finally, the barrel heads are planed with a high pressure water cutting device, dried, sanded, toasted, and treated with hot paraffin. The barrel is then re-assembled, pressure tested, and sulfured for storage.

The inventive subject matter being thus described, it will be obvious that the same may be modified or varied in many ways. Such modifications and variations are not to be regarded as a departure from the spirit and scope of the inventive subject matter and all such modifications and variations are intended to be included within the scope of the following claims.

What is claimed is:

1. A method for reconditioning a barrel previously used for containing a substance, the barrel having an interior surface comprising a barrel interior material, an exterior surface comprising a barrel exterior material, a first end, and a second end, each end comprising a barrel head, the method comprising:

(a) determining cutting parameters specific to the barrel interior material, the barrel exterior material, or both, wherein the cutting parameters provide controlled cutting of the barrel interior material, the barrel exterior material, or both;

(b) removing a desired depth of the barrel interior material or barrel exterior material using an automated high pressure water cutting device at a pressure determined by the cutting parameters;

(c) testing for the presence of a remnant of the substance using a sensor device which is capable of detecting the substance in or on the barrel interior or exterior;

wherein upon detecting the presence of the substance in or on the barrel interior, steps (b) and (c) are repeated.

2. The method of claim 1, wherein the barrel material is wood.

3. The method of claim 1, wherein the substance is selected from the group consisting of wine, beer, liquor, and food.

4. The method of claim 3, wherein the substance is wine.

5. The method of claim 1, wherein the high pressure water cutting device is mounted on a moveable mechanical arm.

6. The method of claim 5, wherein the mechanical arm makes predetermined passes over the barrel interior.

7. The method of claim 1, wherein the automated high pressure water cutting device is controlled by a computer program executed by a computer.

8. The method of claim 7, wherein the cutting parameters are inputted into the computer.

9. The method of claim 1, wherein upon detection of the substance in or on the barrel interior or exterior, a computer which is operably linked to the high pressure water cutting device executes a program to perform the following additional steps:

(d) determining and inputting into the computer the concentration and location of the remnant(s) of the substance detected, (e) determining revised cutting parameters to remove the remnant(s), and (f) repeating steps (b) and (c) based on the revised cutting parameters.

10. The method of claim 1, wherein the sensor device is selected from the group consisting of a light source and light source detector calibrated to detect the substance, and an air sensor calibrated to detect the substance.

11. The method of claim 10, wherein the light source is a laser.

12. The method of claim 1, comprising the additional step of spraying a dissolving solution on a barrel surface.

13. The method of claim 12, comprising the additional step of removing the dissolving solution by rinsing the interior barrel surface.

14. The method of claim 13, wherein the step of rinsing comprises spraying water at a high pressure.

15. The method of claim 1, comprising the additional step of drying the barrel.

16. The method of claim 15, wherein the barrel is dried in a drying chamber.

17. The method of claim 1, comprising the additional step of toasting the barrel.

18. The method of claim 1, comprising the additional step of sulfuring the barrel.

19. The method of claim 1, wherein the barrel has a chime and comprising the additional step of coating the chime with paraffin.

20. The method of claim 1, wherein the barrel has a bung hole, comprising the additional step of searing the bung hole.

21. The method of claim 1, comprising the additional step of planing a barrel head.

22. The method of claim 1, comprising the additional step of installing a strong-back on a barrel head.

23. The method of claim 1, wherein the barrel is a wood or wood composite barrel, comprising the additional step of sanding the barrel, a barrel head, or both.

24. The method of claim 1, comprising the additional step of treating the barrel interior, the barrel exterior, or both with one or more substances which control the rate of evaporation from the barrel.

25. The method of claim 24, wherein the rate of evaporation so controlled is within 10% of the rate of evaporation of a new barrel.

* * * * *